(12) United States Patent
Ni et al.

(10) Patent No.: US 10,555,333 B2
(45) Date of Patent: Feb. 4, 2020

(54) SCHEDULING METHOD, COORDINATED-TRANSMISSION NODE AND CENTRAL COORDINATION NODE FOR DOWNLINK COORDINATED-TRANSMISSION

(71) Applicant: CHINA ACADEMY OF TELECOMMUNICATIONS TECHNOLOGY, Beijing (CN)

(72) Inventors: Hao Ni, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 181 days.

(21) Appl. No.: 14/899,769

(22) PCT Filed: Jul. 3, 2014

(86) PCT No.: PCT/CN2014/081558
§ 371 (c)(1),
(2) Date: Dec. 18, 2015

(87) PCT Pub. No.: WO2015/000419
PCT Pub. Date: Jan. 8, 2015

(65) Prior Publication Data
US 2016/0219616 A1  Jul. 28, 2016

(30) Foreign Application Priority Data

Jul. 4, 2013 (CN) .......................... 2013 1 0279724

(51) Int. Cl.
*H04W 72/12* (2009.01)
*H04B 7/06* (2006.01)
(Continued)

(52) U.S. Cl.
CPC ...... *H04W 72/1273* (2013.01); *H04B 7/0456* (2013.01); *H04B 7/0626* (2013.01); *H04L 5/0035* (2013.01); *H04W 72/1284* (2013.01)

(58) Field of Classification Search
None
See application file for complete search history.

(56) References Cited

U.S. PATENT DOCUMENTS

2011/0021232 A1* 1/2011 Kazmi ................. H04L 5/0007
455/509
2011/0310786 A1* 12/2011 Qin ...................... H04L 5/0032
370/312
(Continued)

FOREIGN PATENT DOCUMENTS

CN  101127719 A  2/2008
CN  101373998 A  2/2009
(Continued)

OTHER PUBLICATIONS

Machine translation of CN101989894A.*
(Continued)

*Primary Examiner* — Faruk Hamza
*Assistant Examiner* — Cassandra L Decker
(74) *Attorney, Agent, or Firm* — Pro-Techtor International Services; Ian Oglesby

(57) ABSTRACT

The present disclosure provides a scheduling method, a coordinated-transmission node and a CCN for downlink coordinated-transmission. The scheduling method at a coordinated-transmission node side includes: receiving, by a coordinated-transmission node, scheduling privilege information corresponding to a downlink time-frequency resource from a CCN, the scheduling privilege information corresponding to the downlink time-frequency resource indicating a scheduling privilege of the coordinated-transmission node over the downlink time-frequency resource;
(Continued)

---

200 performing, by a CCN, scheduling in accordance with channel information about a terminal that accesses to a coordinated-transmission node, and determining a scheduling privilege of each coordinated-transmission node over a downlink time-frequency resource in accordance with a scheduling result

↓  210 transmitting, by the CCN, scheduling privilege information corresponding to the downlink time-frequency resource to the coordinated-transmission node and performing, by the coordinated-transmission node, the scheduling in accordance with the received scheduling privilege information and the latest CSI reported by the terminal. According to the embodiments of the present disclosure, the CCN merely determines the scheduling privilege of each coordinated-transmission node over the downlink time-frequency resource, and each coordinated-transmission node performs the scheduling in accordance with its scheduling privilege and the latest CSI reported by the terminal that is connected to the coordinated-transmission node.

17 Claims, 5 Drawing Sheets

(51) Int. Cl.
*H04B 7/0456* (2017.01)
*H04L 5/00* (2006.01)
*H04L 25/03* (2006.01)
*H04L 1/00* (2006.01)
*H04W 72/14* (2009.01)

(56) References Cited

U.S. PATENT DOCUMENTS

| | | | |
|---|---|---|---|
| 2012/0020319 A1 | 1/2012 | Song | |
| 2012/0122507 A1 | 5/2012 | Gao | |
| 2012/0178462 A1 | 7/2012 | Kim | |
| 2012/0238283 A1* | 9/2012 | Tian | H04W 72/10 455/452.1 |
| 2012/0244900 A1* | 9/2012 | Tian | H04W 72/1231 455/509 |
| 2014/0050183 A1 | 2/2014 | Mochizuki | |
| 2014/0071841 A1* | 3/2014 | Hu | H04L 5/0035 370/252 |
| 2014/0226575 A1* | 8/2014 | Davydov | H04W 52/04 370/329 |

FOREIGN PATENT DOCUMENTS

| | | | |
|---|---|---|---|
| CN | 101989894 A | * | 3/2011 |
| CN | 101989894 A | | 3/2011 |
| CN | 102013903 A | | 4/2011 |
| CN | 102098737 A | | 6/2011 |
| CN | 102355714 A | * | 2/2012 |
| CN | 102355714 A | | 2/2012 |
| WO | WO2012147718 A1 | | 11/2012 |

OTHER PUBLICATIONS

Machine translation of CN102355714A.*
First Office Action regarding Chinese Application No. 201310279724.X, dated May 3, 2017.Translation provided by EPO.
Second Office Action regarding Chinese Application No. 201310279724.X, dated Oct. 18, 2017.Translation provided by EPO.
International Search Report and Written Opinion of the International Searching Authority for International Application No. PCT/CN2014/081558, dated Sep. 30, 2014. Translation provided by WIPO.
EPO Supplementary Search Report and Opinion for EPO application No. 14820341.7 dated May 18, 2016.
EP Communication and Opinion for EPO application No. 14820341.7 dated Oct. 25, 2016.
Office action from TW Patent Application No. 10520239180 dated Feb. 26, 2016, and its English translation.

* cited by examiner

SCHEDULING METHOD, COORDINATED-TRANSMISSION NODE AND CENTRAL COORDINATION NODE FOR DOWNLINK COORDINATED-TRANSMISSION

CROSS-REFERENCE TO RELATED APPLICATION

The present application is the U.S. national phase of PCT Application No. PCT/CN2014/081558 filed on Jul. 3, 2014, which claims a priority of the Chinese patent application No. 201310279724.X filed on Jul. 4, 2013 and entitled "scheduling method, coordinated-transmission node and central coordination node for downlink coordinated-transmission", which is incorporated herein by reference in its entirety.

TECHNICAL FIELD

The present disclosure relates to the field of wireless communication technology, in particular to a scheduling method, a coordinated-transmission node and a central coordination node for downlink coordinated-transmission.

BACKGROUND

In a Long Term Evolution-Advanced (LTE-A) system, a Coordinated-Multiple-Point (CoMP) technique, which relates to coordination among a plurality of Transmission Points (TPs) geographically separated from each other, is adopted so as to reduce adjacent-cell interference for a cell-edge User Equipment (UE) and improve the user experience. Usually, the plurality of TPs refers to base stations in different cells, or a base station in one cell together with a plurality of Remote Radio Heads (RRHs) controlled thereby. The CoMP technique may include a downlink coordinated-transmission technique and an uplink joint reception technique. There mainly exist two schemes for the downlink coordinated-transmission, i.e., Coordinated Scheduling/Coordinated Beamforming (CS/CB) and Joint Processing (JP). In the CS/CB transmission scheme, one of the plurality of TPs transmits a useful signal to the UE, while the other TPs are scheduled or beamformed jointly so as to reduce the interference on the UE as possible. The JP scheme may further include Joint Transmission (JT) and Dynamic Point Selection (DPS). In the JT scheme, the plurality of TPs transmits a useful signal to an identical UE simultaneously, so as to enhance the signal received by the UE. In the DPS scheme, the TPs for the UE are dynamically switched, so as to always select an optimum TP for the UE from the TPs, thereby to transmit the useful signal to the UE. These CoMP schemes may be used in combination with each other, or in combination with a Dynamic Point Blanking (DPB) scheme, so as to dynamically configure some TPs on some time-frequency resources as not to transmit any signal.

In order to achieve the CoMP transmission for one UE, a network configures a measurement set containing at least one base station for the UE. For each base station in the measurement set, the network configures one or more Channel State Information (CSI) processes for the UE, and the UE reports the CSI in accordance with the configurations for each CSI process.

The network performs the CoMP scheduling in accordance with the CSI reported by the UE, and during the scheduling, it is required to exchange a large quantity of information and data among the TPs. In an LTE-LTE-A system, the interaction of the information and data among the TPs is achieved by Backhaul. An information transmission rate and a transmission delay for Backhaul depend on properties of a physical link for Backhaul and a protocol stack delay. When network nodes are connected to each other via a physical link with large capacity, e.g., directly via an optical fiber, the information transmission rate for Backhaul is large (e.g., at a Gbps level). When the network nodes are connected to each other via a physical link with small capacity, e.g., via a wireless transmission link, the information transmission rate for Backhaul is small (e.g., 1 Mbps or less). The transmission delay for the interaction of information over Backhaul is mainly caused by a physical link transmission delay and the protocol stack delay. Different Backhaul links have remarkably different transmission delays, and usually a non-ideal Backhaul transmission delay may be 10 ms or more. In an actual network, there may exist a plurality of physical connection modes for Backhaul.

The downlink CoMP relies on the CSI transmitted from the UE to the TPs. The CSI includes Channel Quality Indicator (CQI), Precoding Matrix Indicator (PMI) and Rank Indicator (RI) and so on. The UE measures a channel from a base station to the UE using downlink reference signals from the respective base stations, and returns the measured CSI via a Serving Cell. A RRH or base station to which the Serving Cell of the UE belongs receives the CSI, and then performs coordinated-scheduling and/or coordinated-precoding with a base station or RRH of a coordination cell, so as to achieve the CoMP. One method for performing coordinated-scheduling and/or coordinated-precoding between the cells is central coordinated-scheduling.

Ideal Backhaul is taken into consideration in the research of CoMP as described in LTE-A Release 11. In the case of the ideal Backhaul, taking the CoMP among the base stations in different cells as an example, the central scheduling mainly includes the following steps.

a. Each coordination base station transmits the latest CSI measured by all the UEs that are connected to the base station to a Central Coordination Node (CCN).

b. The CCN collectively schedules time-domain and frequency-domain resources for the UEs of all the coordination base stations, and precodes the UEs for which the time-domain and frequency-domain resources have been scheduled.

c. The CCN transmits the scheduling and precoding results of the time-frequency resources for each UE to the relevant base stations.

d. The relevant base stations transmit the data to the UE in accordance with the received scheduling and precoding results of the time-domain and frequency-domain resources.

An interface between the CCN and the coordination base station is an X2 interface, so the interaction of the information and data therebetween is achieved via Backhaul.

In the case of the non-ideal Backhaul, when the CoMP central scheduling is performed as mentioned above, the scheduling delay (the time desired from respective coordination base states transmitting CSI to the CCN to they receiving the scheduling and precoding results from the CCN) is at least twice of the Backhaul transmission delay from the CCN to the base station. In addition, when the Backhaul transmission delays from the CCN to the respective coordination base stations are different from each other, the scheduling delay for the coordination base station is twice of the maximum Backhaul transmission delay so as to apply the scheduling result in the respective coordination base stations simultaneously. For a typical Backhaul transmission delay (10 ms), the scheduling delay for the above CoMP central scheduling procedure is substantially 20 ms in the case of the non-ideal Backhaul. It means that, respective coordination base stations perform the CoMP transmission in accordance with the CSI reported by the UE 20 ms ago. The CoMP transmission performance will be seriously affected by the out-of-date CSI.

SUMMARY

An object of the present disclosure is to provide a scheduling method, a coordinated-transmission node and a CCN for downlink coordinated-transmission, so as to prevent the CoMP transmission performance from being adversely affected by a non-ideal Backhaul transmission delay during the central scheduling.

In one aspect, the present disclosure provides in some embodiments a scheduling method for downlink coordinated-transmission, including steps of:

receiving, by a coordinated-transmission node, scheduling privilege information corresponding to a downlink time-frequency resource from a CCN, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals connected to coordinated-transmission nodes; and performing, by the coordinated-transmission node, scheduling in accordance with the received scheduling privilege information and the latest CSI reported by the terminal.

Alternatively, the step of performing, by the coordinated-transmission node, scheduling in accordance with the received scheduling privilege information and the latest CSI reported by the terminal includes:

determining the downlink time-frequency resource corresponding to a downlink time-frequency resource identifier in accordance with the downlink time-frequency resource identifier contained in the received scheduling privilege information;

determining that the terminal is allowed to be scheduled in accordance with indication information contained in the received scheduling privilege information and indicating that the terminal is allowed to be scheduled; and scheduling the terminal over the downlink time-frequency resource corresponding to the downlink time-frequency resource identifier in accordance with the latest CSI reported by the terminal.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The step of scheduling the terminal over the downlink time-frequency resource corresponding to the downlink time-frequency resource identifier in accordance with the latest CSI reported by the terminal includes:

scheduling the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the step of scheduling the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited includes:

determining interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determining a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determining a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

In some alternative embodiments, the step of performing, by the coordinated-transmission node, scheduling in accordance with the received scheduling privilege information and the latest CSI reported by the terminal includes:

determining a downlink time-frequency resource corresponding to a downlink time-frequency resource identifier in accordance with the downlink time-frequency resource identifier contained in the received scheduling privilege information;

determining that a further coordinated-transmission node is allowed to be scheduled in accordance with indication information contained in the received scheduling privilege information and indicating that the scheduling is allowed to be performed for the further coordinated-transmission node;

determining whether or not the terminal is to be scheduled over the downlink time-frequency resource corresponding to the downlink time-frequency resource identifier in accordance with the latest CSI reported by the terminal, the further coordinated-transmission node being contained in a measurement set of the terminals; and when it is determined that the terminal is to be scheduled over the downlink time-frequency resource corresponding to the downlink time-frequency resource identifier, scheduling the terminal over the downlink time-frequency resource corresponding to the downlink time-frequency resource identifier, and transmitting scheduling information to the further coordinated-transmission node.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The step of scheduling the terminal over the downlink time-frequency resource corresponding to the downlink time-frequency resource identifier includes:

scheduling the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the step of scheduling the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited includes:

determining interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determining a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determining a precoding matrix available for the further coordinated-transmission node during the downlink transmission in accordance with the indication information about the precoding matrix in which the use of the interference-avoided coordinated-transmission node is limited.

Prior to performing, by the coordinated-transmission node, scheduling in accordance with the received scheduling privilege information and the latest CSI reported by the terminal, the method further includes:

receiving, by the coordinated-transmission node, valid time information corresponding to the scheduling privilege information from the CCN; and determining, by the coordinated-transmission node, whether or not a time domain of the downlink time-frequency resource falls within a time period indicated by the valid time information in accordance with the valid time information, and when it is determined that the time domain of the downlink time-frequency resource falls within the time period indicated by the valid time information, performing the scheduling in accordance with the received scheduling privilege information and the latest CSI reported by the terminal.

In another aspect, the present disclosure provides in some embodiments a scheduling method for downlink coordinated-transmission, including steps of:

determining, by a CCN, a scheduling privilege of each coordinated-transmission node over a downlink time-frequency resource in accordance with channel information about a terminal that is connected to the coordinated-transmission node; and transmitting, by the CCN, scheduling privilege information corresponding to the downlink time-frequency resource to the coordinated-transmission node, so that the coordinated-transmission node performs scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the step of determining, by the CCN, the scheduling privilege of each coordinated-transmission node over the downlink time-frequency resource in accordance with the channel information about the terminal that is connected to the coordinated-transmission node includes:

for a coordinated-transmission node where single-cell transmission to the terminal over the downlink time-frequency resource has been determined in accordance with the channel information about the terminal that is connected to the coordinated-transmission node, determining its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determining its scheduling privilege over the downlink time-frequency resource as allowing the scheduling to be performed for a further coordinated-transmission node, and determining a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determining its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determining its scheduling privilege over the downlink time-frequency resource as limiting the use of a precoding matrix during the transmission.

Alternatively, when the scheduling privilege of the coordinated-transmission node over the downlink time-frequency resource has been determined as allowing the terminal that is connected to the coordinated-transmission node to be scheduled, the scheduling privilege information transmitted to the coordinated-transmission node includes a downlink time-frequency resource identifier and indication information indicating that the terminal is allowed to be scheduled.

Alternatively, when the scheduling privilege of the coordinated-transmission node over the downlink time-frequency resource has been determined as allowing the scheduling to be performed for the further coordinated-transmission node, the scheduling privilege information transmitted to the coordinated-transmission node includes a downlink time-frequency resource identifier and indication information indicating that the scheduling is allowed to be performed for the further coordinated-transmission node.

Alternatively, when the scheduling privilege of the coordinated-transmission node over the downlink time-frequency resource has been determined as receiving the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

The scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

The method further includes transmitting, by the CCN, valid time information corresponding to the scheduling privilege information to the coordinated-transmission node.

In yet another aspect, the present disclosure provides in some embodiments a coordinated-transmission node for downlink coordinated-transmission, including:

a scheduling privilege information reception module configured to receive scheduling privilege information corresponding to a downlink time-frequency resource from a CCN, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals connected to coordinated-transmission nodes; and a scheduling processing module configured to performing scheduling in accordance with the received scheduling privilege information and the latest CSI reported by the terminal.

Alternatively, the scheduling processing module is specifically configured to:

determine the downlink time-frequency resource corresponding to a downlink time-frequency resource identifier in accordance with the downlink time-frequency resource identifier contained in the received scheduling privilege information;

determine that the terminal is allowed to be scheduled in accordance with indication information contained in the received scheduling privilege information and indicating that the terminal is allowed to be scheduled; and schedule the terminal over the downlink time-frequency resource corresponding to the downlink time-frequency resource identifier in accordance with the latest CSI reported by the terminal.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The scheduling processing module is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the scheduling processing module is specifically configured to:

determine interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determine a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

In some alternative embodiments, the scheduling processing module is specifically configured to:

determine a downlink time-frequency resource corresponding to a downlink time-frequency resource identifier in accordance with the downlink time-frequency resource identifier contained in the received scheduling privilege information;

determine that a further coordinated-transmission node is allowed to be scheduled in accordance with indication information contained in the received scheduling privilege information and indicating that the scheduling is allowed to be performed for the further coordinated-transmission node;

determine whether or not the terminal is to be scheduled over the downlink time-frequency resource corresponding to the downlink time-frequency resource identifier in accordance with the latest CSI reported by the terminal, the further coordinated-transmission node being contained in a measurement set of the terminals; and when it is determined that the terminal is to be scheduled over the downlink time-frequency resource corresponding to the downlink time-frequency resource identifier, schedule the terminal over the downlink time-frequency resource corresponding to the downlink time-frequency resource identifier, and transmitting scheduling information to the further coordinated-transmission node.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The scheduling processing module is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the scheduling processing module is specifically configured to:

determine interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determine a precoding matrix available for the further coordinated-transmission node during the downlink transmission in accordance with the indication information about the precoding matrix in which the use of the interference-avoided coordinated-transmission node is limited.

The coordinated-transmission node further includes a valid time determination module configured to receive valid time information corresponding to the scheduling privilege information from the CCN, and determine whether or not a time domain of the downlink time-frequency resource falls within a time period indicated by the valid time information in accordance with the valid time information, and when it is determined that the time domain of the downlink time-frequency resource falls within the time period indicated by the valid time information, the scheduling processing module performs the scheduling in accordance with the received scheduling privilege information and the latest CSI reported by the terminal.

In still yet another aspect, the present disclosure provides in some embodiments a CCN for downlink coordinated-transmission, including:

a scheduling privilege determination module configured to determine a scheduling privilege of each coordinated-transmission node over a downlink time-frequency resource in accordance with channel information about a terminal that is connected to the coordinated-transmission node; and a scheduling privilege information transmission module configured to transmitting scheduling privilege information corresponding to the downlink time-frequency resource to the coordinated-transmission node, so that the coordinated-transmission node performs scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the scheduling privilege determination module is specifically configured to:

for a coordinated-transmission node where single-cell transmission to the terminal over the downlink time-frequency resource has been determined in accordance with the channel information about the terminal that is connected to the coordinated-transmission node, determine its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determine its scheduling privilege over the downlink time-frequency resource as allowing the scheduling to be performed for a further coordinated-transmission node, and determine a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determine its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determine its scheduling privilege over the downlink time-frequency resource as limiting the use of a precoding matrix during the transmission.

Alternatively, when the scheduling privilege of the coordinated-transmission node over the downlink time-frequency resource has been determined as allowing the terminal that is connected to the coordinated-transmission node to be scheduled, the scheduling privilege information transmitted to the coordinated-transmission node includes a downlink time-frequency resource identifier and indication information indicating that the terminal is allowed to be scheduled.

Alternatively, when the scheduling privilege of the coordinated-transmission node over the downlink time-frequency resource has been determined as allowing the scheduling to be performed for the further coordinated-transmission node, the scheduling privilege information transmitted to the coordinated-transmission node includes a downlink time-frequency resource identifier and indication information indicating that the scheduling is allowed to be performed for the further coordinated-transmission node.

Alternatively, when the scheduling privilege of the coordinated-transmission node over the downlink time-frequency resource has been determined as receiving the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

The scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

The CCN further includes a valid time transmission module configured to transmit valid time information corresponding to the scheduling privilege information to the coordinated-transmission node.

In still yet another aspect, the present disclosure provides in some embodiments a coordinated-transmission node for downlink coordinated-transmission, including a transceiver and at least one processor connected to the transceiver. The transceiver is configured to receive scheduling privilege information corresponding to a downlink time-frequency resource from a CCN, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals connected to coordinated-transmission nodes. The processor is configured to perform scheduling in accordance with the scheduling privilege information received by the transceiver and the latest CSI reported by the terminal.

In some alternative embodiments, the processor is specifically configured to:

determine the downlink time-frequency resource corresponding to a downlink time-frequency resource identifier in accordance with the downlink time-frequency resource identifier contained in the received scheduling privilege information received by the transceiver;

determine that the terminal is allowed to be scheduled in accordance with indication information contained in the scheduling privilege information received by the transceiver and indicating that the terminal is allowed to be scheduled; and schedule the terminal over the downlink time-frequency resource corresponding to the downlink time-frequency resource identifier in accordance with the latest CSI reported by the terminal.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The processor is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the processor is specifically configured to:

determine interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determine a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

In some alternative embodiments, the processor is specifically configured to:

determine a downlink time-frequency resource corresponding to a downlink time-frequency resource identifier in accordance with the downlink time-frequency resource identifier contained in the scheduling privilege information received by the transceiver;

determine that a further coordinated-transmission node is allowed to be scheduled in accordance with indication information contained in the scheduling privilege information received by the transceiver and indicating that the scheduling is allowed to be performed for the further coordinated-transmission node;

determine whether or not the terminal is to be scheduled over the downlink time-frequency resource corresponding to the downlink time-frequency resource identifier in accordance with the latest CSI reported by the terminal, the further coordinated-transmission node being contained in a measurement set of the terminals; and when it is determined that the terminal is to be scheduled over the downlink time-frequency resource corresponding to the downlink time-frequency resource identifier, schedule the terminal over the downlink time-frequency resource corresponding to the downlink time-frequency resource identifier, and trigger the transceiver to transmit scheduling information to the further coordinated-transmission node.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The processor is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the processor is specifically configured to:

determine interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determine a precoding matrix available for the further coordinated-transmission node during the downlink transmission in accordance with the indication information about the precoding matrix in which the use of the interference-avoided coordinated-transmission node is limited.

Alternatively, the transceiver is further configured to receive valid time information corresponding to the scheduling privilege information from the CCN. The processor is further configured to determine whether or not a time domain of the downlink time-frequency resource falls within a time period indicated by the valid time information in accordance with the valid time information, and when it is determined that the time domain of the downlink time-frequency resource falls within the time period indicated by the valid time information, perform the scheduling in accordance with the received scheduling privilege information and the latest CSI reported by the terminal.

In still yet another aspect, the present disclosure provides in some embodiments a CCN for downlink coordinated-transmission, including a transceiver and at least one processor connected to the transceiver. The processor is configured to determine a scheduling privilege of each coordinated-transmission node over a downlink time-frequency resource in accordance with channel information about a terminal that is connected to the coordinated-transmission node. The transceiver is configured to transmit scheduling privilege information corresponding to the downlink time-frequency resource to the coordinated-transmission node, so that the coordinated-transmission node performs scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the processor is specifically configured to:

for a coordinated-transmission node where single-cell transmission to the terminal over the downlink time-frequency resource has been determined in accordance with the channel information about the terminal that is connected to the coordinated-transmission node, determine its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determine its scheduling privilege over the downlink time-frequency resource as allowing the scheduling to be performed for a further coordinated-transmission node, and determine a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determine its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determine its scheduling privilege over the downlink time-frequency resource as limiting the use of a precoding matrix during the transmission.

Alternatively, when the scheduling privilege of the coordinated-transmission node over the downlink time-frequency resource has been determined as allowing the terminal that is connected to the coordinated-transmission node to be scheduled, the scheduling privilege information transmitted to the coordinated-transmission node includes a downlink time-frequency resource identifier and indication information indicating that the terminal is allowed to be scheduled.

Alternatively, when the scheduling privilege of the coordinated-transmission node over the downlink time-frequency resource has been determined as allowing the scheduling to be performed for the further coordinated-transmission node, the scheduling privilege information transmitted to the coordinated-transmission node includes a downlink time-frequency resource identifier and indication information indicating that the scheduling is allowed to be performed for the further coordinated-transmission node.

Alternatively, when the scheduling privilege of the coordinated-transmission node over the downlink time-frequency resource has been determined as receiving the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

The scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

Alternatively, the transceiver is further configured to transmit valid time information corresponding to the scheduling privilege information to the coordinated-transmission node.

According to the embodiments of the present disclosure, the CCN merely determines the scheduling privilege of each coordinated-transmission node over the downlink time-frequency resource, and each coordinated-transmission node performs scheduling in accordance with its scheduling privilege and the latest CSI reported by the terminal that is connected to the coordinated-transmission node. As a result, it is able to prevent the CSI from being out-of-date due to the non-ideal Backhaul transmission delay, thereby to prevent the CoMP transmission performance from being adversely affected.

DETAILED DESCRIPTION

According to the embodiments of the present disclosure, a CCN determines a scheduling privilege of each coordinated-transmission node over a downlink time-frequency resource in accordance with channel information about a terminal that is connected to the coordinated-transmission node, and transmits scheduling privilege information corresponding to the downlink time-frequency resource to the coordinated-transmission node. Then, the coordinated-transmission node performs the scheduling in accordance with the received scheduling privilege information and the latest CSI reported by the terminal. When applied to the non-ideal Backhaul downlink coordinated-transmission, it is able for the present disclosure to prevent the CSI from being out-of-date due to the non-ideal Backhaul transmission delay, thereby to prevent the CoMP transmission performance from being adversely affected.

The scheduling privilege information corresponding to the downlink time-frequency resource and transmitted to the coordinated-transmission note indicates a scheduling privilege of the coordinated-transmission node over the downlink time-frequency resource, and the channel information about the terminal may include, but not limited to, the CSI reported by the terminal, and/or any other channel measurement/ statistic information.

In the embodiments of the present disclosure, the so-called CNN may be achieved by an existing network node. For example, a certain transmission node for the downlink coordinated-transmission may serve as the CCN, or a network node connected to each transmission node for the downlink coordinated-transmission may serve as the CCN. The so-called coordinated-transmission node refers to a transmission node for the downlink coordinated-transmission, the scheduling of which is controlled by the CCN. The coordinated-transmission nodes may refer to base stations in different cells (in the embodiments of the present disclosure, the base station may include an eNB), or a plurality of RRHs belonging to the base station in an identical cell.

The present disclosure will be described hereinafter in conjunction with the drawings and embodiments.

Figure 1:
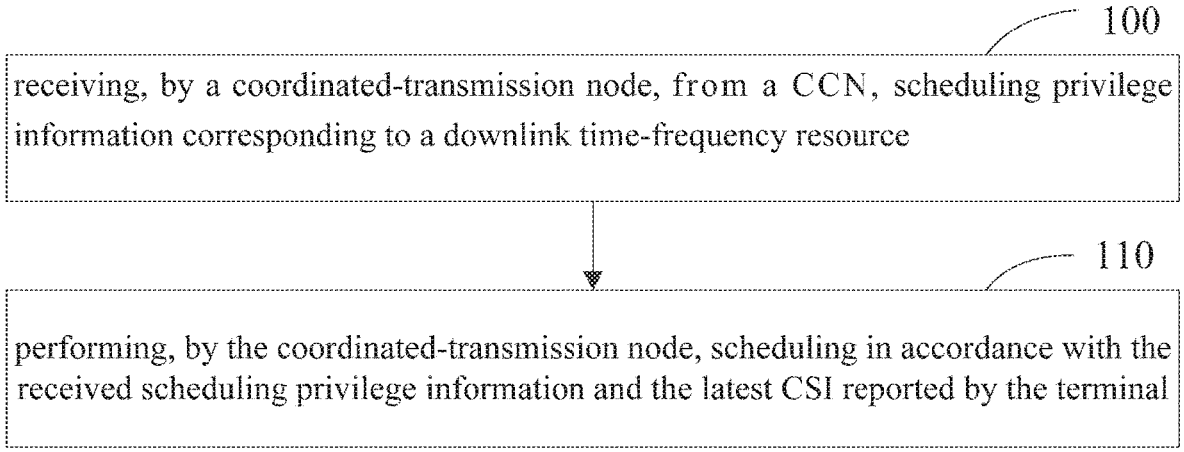
FIG. 1 is a flow chart of a scheduling method for downlink coordinated-transmission according to one embodiment of the present disclosure.

Referring to FIG. 1, a scheduling method for downlink coordinated-transmission in some embodiments of the present disclosure includes the following steps.

Step 100: receiving, by a coordinated-transmission node, scheduling privilege information corresponding to a downlink time-frequency resource from a CCN. The scheduling privilege information corresponding to the downlink time-frequency resource indicates a scheduling privilege of the coordinated-transmission node over the downlink time-frequency resource, and the scheduling privilege of the coordinated-transmission node over the downlink time-frequency resource is determined by the central coordination node in accordance with channel information about terminals of coordinated-transmission nodes.

Step 110: performing, by the coordinated-transmission node, the scheduling in accordance with the received scheduling privilege information and the latest CSI reported by the terminal.

In the embodiments of the present disclosure, the scheduling privilege information corresponding to a plurality of downlink time-frequency resource may be transmitted via an identical message, or the scheduling privilege information corresponding to one downlink time-frequency resource may be transmitted via one message.

In the embodiments of the present disclosure, the scheduling privilege information corresponding to the downlink time-frequency resource may include, but not limited to, a downlink time-frequency resource identifier and indication information corresponding to the downlink time-frequency resource identifier. The indication information may include indication information indicating that the terminal is allowed to be scheduled, and/or indication information indicating that the scheduling is allowed to be performed for a further coordinated-transmission node Alternatively, the scheduling privilege information corresponding to the downlink time-frequency resource may further include indication information about a blanked coordinated-transmission node over the downlink time-frequency resource. This indication information may be identification information about each blanked coordinated-transmission node and corresponding to the downlink time-frequency resource identifier, or bitmap information indicating the coordinated-transmission nodes to be blanked and corresponding to the downlink time-frequency resource identifier.

Alternatively, the scheduling privilege information corresponding to the downlink time-frequency resource may further include indication information about an interference-avoided coordinated-transmission node over the downlink time-frequency resource, and indication information about a precoding matrix in which the use of the interference-avoided coordinated-transmission node is limited.

The indication information about the interference-avoided coordinated-transmission node over the downlink time-frequency resource and the indication information about the precoding matrix in which the use of the interference-avoided coordinated-transmission node is limited may be an interference-avoided coordinated-transmission node identifier corresponding to the downlink time-frequency resource identifier and a set of available (or unavailable) precoding matrices corresponding to the interference-avoided coordinated-transmission node identifier, or an interference-avoided coordinated-transmission node identifier corresponding to the downlink time-frequency resource identifier and bitmap information about the available (or unavailable) precoding matrices corresponding to interference-avoided coordinated-transmission node identifier.

Further, prior to Step 110, the coordinated-transmission node may further receive valid time information corresponding to the scheduling privilege information corresponding to the downlink time-frequency resource from the CCN, determines whether or not a time domain of the downlink time-frequency resource falls within a time period indicated by the valid time information in accordance with the valid time information, and when it is determined that the time domain of the downlink time-frequency resource falls within the time period indicated by the valid time information, performs the scheduling in accordance with the received scheduling privilege information and the latest CSI reported by the terminal.

In the embodiments of the present disclosure, the scheduling privilege information may be transmitted via one message with the corresponding valid time information.

Based on the above descriptions on the scheduling privilege information and/or valid time information, when the received indication information is the indication information indicating that the terminal is allowed to be scheduled, the step of performing, by the coordinated-transmission node, the scheduling in accordance with the received scheduling privilege information and the latest CSI reported by the terminal may include: determining the downlink time-frequency resource corresponding to a downlink time-frequency resource identifier in accordance with the downlink time-frequency resource identifier contained in the received scheduling privilege information; determining that the terminal is allowed to be scheduled in accordance with indication information contained in the received scheduling privilege information and indicating that the terminal is allowed to be scheduled; and scheduling the terminal over the downlink time-frequency resource corresponding to the downlink time-frequency resource identifier in accordance with the latest CSI reported by the terminal.

In the embodiments of the present disclosure, when the scheduling privilege information further includes the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier and the indication information about the precoding matrix in which the use of the interference-avoided coordinated-transmission node is limited, the terminal is scheduled over the downlink time-frequency resource corresponding to the downlink time-frequency resource identifier in accordance with the latest CSI reported by the terminal as well as the above-mentioned pieces of indication information.

Correspondingly, the step of scheduling the terminal over the downlink time-frequency resource corresponding to the downlink time-frequency resource identifier may include:

determining interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determining a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determining a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

The blanked coordinated-transmission node over the corresponding downlink time-frequency resource may be determined in accordance with the indication information about the blanked coordinated-transmission node over the downlink time-frequency resource corresponding to the downlink time-frequency resource identifier. The information about the precoding matrix in which the use of the interference-avoided coordinated-transmission node is limited over the corresponding downlink time-frequency resource may be determined in accordance with the indication information about the interference-avoided coordinated-transmission node over the downlink time-frequency resource corresponding to the downlink time-frequency resource identifier and the indication information about the precoding matrix in which the use of the interference-avoided coordinated-transmission node is limited. The transmission mode for the terminal over the downlink time-frequency resource may be determined in accordance with the determined interference of the other coordinated-transmission nodes on the coordinated-transmission node over the downlink time-frequency resource corresponding to the downlink time-frequency resource identifies as well as the latest CSI reported by the terminal. The determination of the transmission mode may refer to the existing resource scheduling mode, and thus will not be particularly defined herein. The so-called transmission mode may be single-cell transmission, blanking of dynamic transmission points, selection of dynamic transmission points, JT transmission, and/or CS/CB transmission. The so-called single-cell transmission refers to the downlink transmission to the terminal via only one fixed transmission point.

When the indication information about the precoding matrix in which the use of the interference-avoided coordinated-transmission node is limited indicates the set of precoding matrices available for the coordinated-transmission node, the available precoding matrix may be selected from the set. When the indication information about the precoding matrix in which the use of the interference-avoided coordinated-transmission node is limited indicates the set of precoding matrices unavailable for the coordinated-transmission node, the precoding matrix beyond the set may be selected.

Based on the above descriptions on the scheduling privilege information and/or valid time information, when the received indication is indication information indicating that the scheduling is allowed to be performed for a further coordinated-transmission node, the step of performing, by the coordinated-transmission node, the scheduling in accordance with the received scheduling privilege information and the latest CSI reported by the terminal may include: determining a downlink time-frequency resource corresponding to a downlink time-frequency resource identifier in accordance with the downlink time-frequency resource identifier contained in the received scheduling privilege information; determining that a further coordinated-transmission node is allowed to be scheduled in accordance with indication information contained in the received scheduling privilege information and indicating that the scheduling is allowed to be performed for the further coordinated-transmission node; determining whether or not the terminal is to be scheduled over the downlink time-frequency resource corresponding to the downlink time-frequency resource identifier in accordance with the latest CSI reported by the terminal, the terminal being a terminal where the further coordinated-transmission node is contained in a measurement set; and when it is determined that the terminal is to be scheduled over the downlink time-frequency resource corresponding to the downlink time-frequency resource identifier, scheduling the terminal over the downlink time-frequency resource corresponding to the downlink time-frequency resource identifier, and transmitting scheduling information to the further coordinated-transmission node.

When it is determined that the terminal where the further coordinated-transmission node is not contained in the measurement set is not scheduled over the downlink time-frequency resource corresponding to the time-frequency resource identifier, the scheduling information may not be transmitted to the further coordinated-transmission node, or indication information about voluntary scheduling may be transmitted to the further coordinated-transmission node.

When the scheduling privilege information further includes the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited, the terminal is scheduled over the downlink time-frequency resource corresponding to the downlink time-frequency resource identifier in accordance with the latest CSI reported by the terminal as well as the above-mentioned pieces of indication information.

Correspondingly, the step of scheduling the terminal over the downlink time-frequency resource corresponding to the downlink time-frequency resource identifier may include:

determining interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determining a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determining a precoding matrix available for the further coordinated-transmission node during the downlink transmission in accordance with the indication information about the precoding matrix in which the use of the interference-avoided coordinated-transmission node is limited.

In the embodiments of the present disclosure, when the coordinated-transmission node does not receive the indication information indicating that the terminal is allowed to be scheduled or the indication information indicating that the scheduling is allowed to be performed for the further coordinated-transmission node, but it is determined that the coordinated-transmission node is blanked over the downlink time-frequency resource in accordance with the indication information about the blanked coordinated-transmission node over the downlink time-frequency resource corresponding to the downlink time-frequency resource identifier, the downlink transmission is not performed over the downlink time-frequency resource.

In the embodiments of the present disclosure, when the coordinated-transmission node does not receive the indication information indicating that the terminal is allowed to be scheduled or the indication information indicating that the scheduling is allowed to be performed for the further coordinated-transmission node, but it has received the indication information indicating the reception of the scheduling information from the other coordinated-transmission nodes, it receives the scheduling information from the indicated coordinated-transmission nodes within a predetermined period of time, and transmits the downlink data in accordance with the received scheduling information or enters a blanking state. To be specific, when the received scheduling information includes the precoding matrix, CQI, and Modulation and Coding Scheme (MCS), the coordinated-transmission node transmits the downlink data in accordance with the scheduling information, and when the received scheduling information indicates the blanking state, the coordinated-transmission node is blanked over the corresponding downlink time-frequency resource.

The predetermined period of time may be predetermined reception valid time for the coordinated-transmission node, and alternatively, when valid time corresponding to the scheduling privilege information is received, the predetermined period of time may be the valid time.

When the scheduling information is not received within the predetermined period of time, the terminal may be scheduled over the downlink time-frequency resource corresponding to the downlink time-frequency resource identifier in accordance with the latest CSI reported by the terminal (alternatively, as well as the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited), or the coordinated-transmission node may be blanked over the corresponding downlink time-frequency resource.

In addition, when the scheduling information is not received within the predetermined period of time but the indication information about voluntary scheduling has been received, the terminal may be scheduled over the downlink time-frequency resource corresponding to the downlink time-frequency resource identifier in accordance with the latest CSI reported by the terminal (alternatively, as well as the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited).

Figure 2:
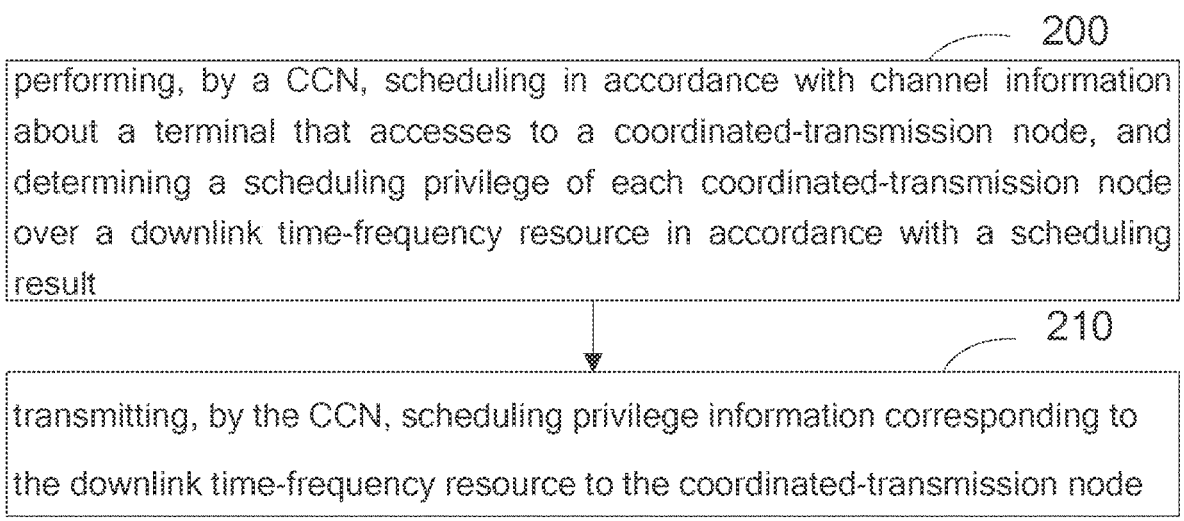
FIG. 2 is another flow chart of the scheduling method for downlink coordinated-transmission according to one embodiment of the present disclosure.

Referring to FIG. 2, another scheduling method for downlink coordinated-transmission in some embodiments of the present disclosure includes the following steps.

Step 200: determining, by a CCN, a scheduling privilege of each coordinated-transmission node over a downlink time-frequency resource in accordance with channel information about a terminal that is connected to the coordinated-transmission node.

Alternatively, the scheduling may be performed in accordance with the channel information about the terminal that is connected to each coordinated-transmission node as well as service information of the terminal.

The service information about the terminal may be notified to the CCN via the coordinated-transmission node in a semi-static manner. The coordinated-transmission node receives and caches the service information (including service priorities, service quality, service type and service data volume) about the terminal that is connected to the coordinated-transmission node from a core network, and notifies the cached service information to the CCN in a semi-static manner. The determination of the scheduling privilege of each coordinated-transmission node over the downlink time-frequency resource may be considered as a pre-scheduling procedure.

Step 210: transmitting, by the CCN, scheduling privilege information corresponding to the downlink time-frequency resource to the coordinated-transmission node, so that the coordinated-transmission node performs the scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the step of determining, by the CCN, the scheduling privilege of each coordinated-transmission node over the downlink time-frequency resource in accordance with the channel information about the terminal that is connected to the coordinated-transmission node may include, but not limited to:

for a coordinated-transmission node where single-cell transmission to the terminal over the downlink time-frequency resource has been determined in accordance with the channel information about the terminal that is connected to the coordinated-transmission node, determining its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determining its scheduling privilege over the downlink time-frequency resource as allowing the scheduling to be performed for a further coordinated-transmission node, and determining a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determining its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determining its scheduling privilege over the downlink time-frequency resource as limiting the use of a precoding matrix during the transmission.

When it is determined that the scheduling privilege of the coordinated-transmission node over the downlink time-frequency resource is to allow the terminal to be scheduled, the scheduling privilege information transmitted to the coordinated-transmission node includes a downlink time-frequency resource identifier and indication information about allowing the terminal to be scheduled.

When it is determined that the scheduling privilege of the coordinated-transmission node over the downlink time-frequency resource is to allow the scheduling to be performed for a further coordinated-transmission node, the scheduling privilege information transmitted to the coordinated-transmission node includes a downlink time-frequency resource identifier and indication information indicating that the scheduling is allowed to be performed for the further coordinated-transmission node.

When it is determined that the scheduling privilege of the coordinated-transmission node over the downlink time-frequency resource is to receive the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

Based on the above method performed at a CCN side, alternatively, the scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

Based on the above method performed at the CCN side, alternatively, the CCN further transmits valid time information corresponding to the scheduling privilege information to the coordinated-transmission node.

It should be appreciated that, when the CCN determines that the terminal is allowed to be scheduled at the coordinated-transmission node over a certain downlink time-frequency resource, it may not transmit the scheduling privilege information corresponding to the downlink time-frequency resource to the coordinated-transmission node. Correspondingly, when the coordinated-transmission node does not receive the scheduling privilege information corresponding to a certain downlink time-frequency resource, it is determined that the terminal is allowed to be scheduled over the downlink time-frequency resource at the coordinated-transmission node, and at this time, the terminal is scheduled over the downlink time-frequency resource in accordance with the latest CSI reported by the terminal.

CoMP transmission among base stations in different cells is taken as an example hereinafter. The coordinated-transmission is performed among three base stations in a system, i.e., base station 1, base station 2 and base station 3. Each base station is provided with two terminals, i.e., UE1 (CoMP UE, a measurement set of which includes base station 1 and base station 3) and UE2 (CoMP UE, a measurement set of which includes base station 1 and base station 2) for base station 1, UE3 (CoMP UE, a measurement set of which includes base station 2 and base station 3) and UE4 for base station 2, and UE5 and UE6 for base station 3.

Base stations 1-3 receive and cache service data transmitted from the core network to the terminals, respectively, and report the service data to the CCN in a semi-static manner.

Figure 3:
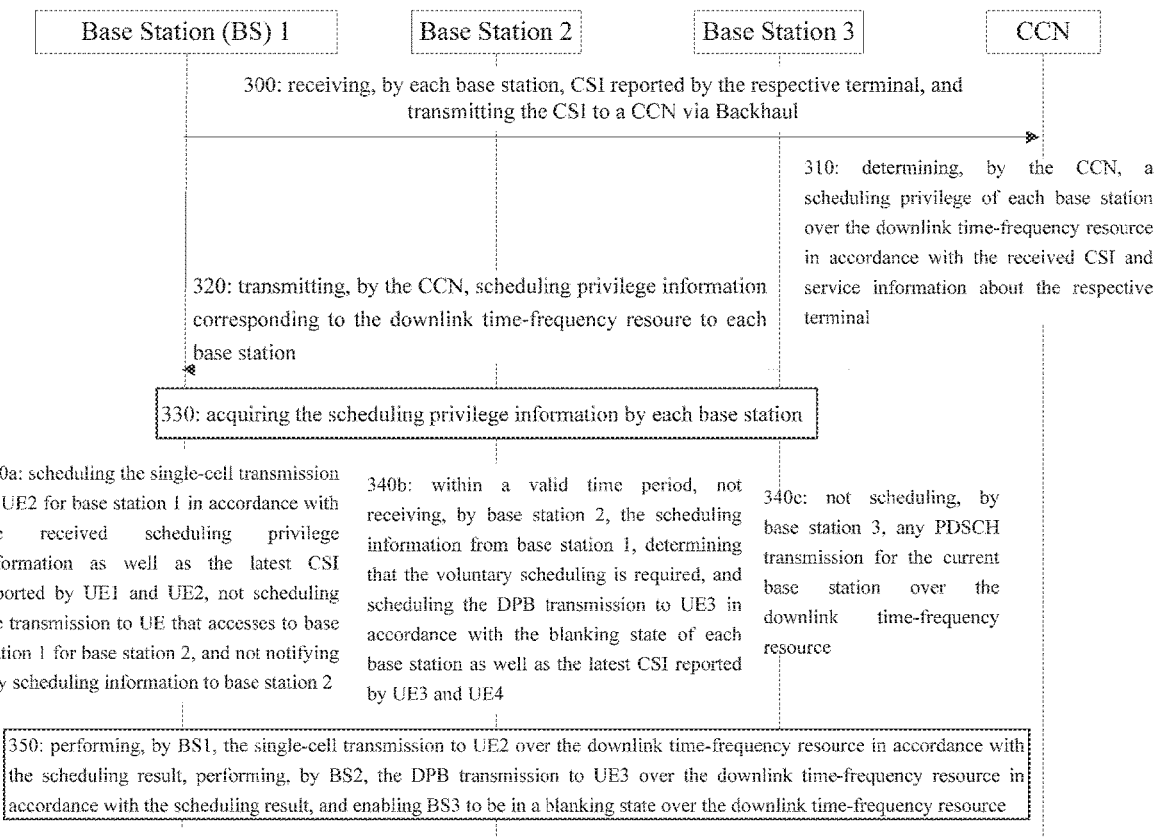
FIG. 3 is yet another flow chart of the scheduling method for downlink coordinated-transmission according to one embodiment of the present disclosure.

With respect to a certain downlink time-frequency resource, as shown in FIG. 3, a corresponding CoMP scheduling mode may include the following steps.

Step 300: receiving, by each base station, the CSI reported by the respective terminal, and transmitting the CSI to the CCN via Backhaul. Alternatively, each base station further receives the other channel measurement information reported by the respective terminal and transmits it to the CCN via Backhaul, or measures or counts channels and transmits channel measurement/statistic information to the CCN via Backhaul.

Step 310: determining, by the CCN, a scheduling privilege of each base station over the downlink time-frequency resource in accordance with the received CSI and the service information about the respective terminal.

When the other channel measurement/statistic information is further reported by the base station, the CCN may determine the scheduling privilege of each base station over the downlink time-frequency resource in accordance with the CSI, the other channel measurement/statistic information and the service information about the terminal.

To be specific, CCN pre-schedules DPB transmission to UE1 for base station 1, with base station 3 being in a blanking state; pre-schedules DPS/DPB transmission to UE2 for base station 2, with base station 3 being in the blanking state; and pre-schedules the blanking state for base station 3.

The pre-scheduling mode is substantially identical to the CCN scheduling, except that the CCN does not transmit the scheduling information generated at the pre-scheduling procedure to each base station, and instead, it determines the scheduling privilege of each base station in accordance with a pre-scheduling result and then transmits the scheduling privilege information to each base station.

To be specific, in accordance with the above pre-scheduling results, the CCN determines that base station 1 may perform the single-cell transmission over the downlink time-frequency resource, that DPS transmission may be performed between base station 1 and base station 2 and the transmission point is dynamically selected by base station 1 (i.e., base station 1 is allowed to perform the scheduling for base station 2), and that base station 3 is in the blanking state.

Step 320: transmitting, by the CCN, the scheduling privilege information corresponding to the downlink time-frequency resource to each base station.

A message for transmitting the scheduling privilege information includes an information bit carrying the downlink time-frequency resource identifier, an information bit representing whether or not the signal-cell transmission of a current base station is allowed, a bitmap representing a blanking state of each base station, an information bit representing whether or not to receive the scheduling information from a base station as a transmitter and an associated information bit carrying a base station identifier, an information bit representing whether or not to allow the scheduling to be performed for a base station as a receiver and an associated information bit carrying a base station identifier, a bitmap representing available (unavailable) precoding matrices corresponding to the base station identifiers, and an information bit representing valid time. Each information bit consists of at least one bit.

It should be appreciated that, the above description is for illustrative purposes only, but shall not be used to limit the message format.

To be specific, in the message for transmitting the scheduling privilege information from the CCN to base station 1, information bit representing whether or not to allow the single-cell transmission of a current base station is set to be 1 represents that base station 1 may perform the single-cell transmission as indicated by the CCN. In the bitmap representing the blanking state of each base station, bit corresponding to base station 3 is set to be 1 represents that base station 3 is blanked, and bit corresponding to base station 1 and base station 2 is set to be 0 represents that these base stations are not blanked. Information bit representing whether or not to receive the scheduling information from a base station as a transmitter is set to be 0 represents that the scheduling information is not received from the base station, and an associated information bit carrying a base station identifier is null. Information bit representing whether or not to allow the scheduling to be performed for a base station as a receiver is set to be 1 represents that the scheduling is allowed to be performed for the base station, and an associated information bit carrying a base station identifier carriers an identifier of base station 2. The bitmap about the available (or unavailable) precoding matrix corresponding to each base station identifier is null, i.e., no available (or unavailable) precoding matrix is indicated.

In the message for transmitting the scheduling privilege information from the CCN to base station 2, information bit representing whether or not to allow the single-cell transmission of a current base station is set to be 0 represents that base station 2 may not perform the single-cell transmission as indicated by the CCN. In the bitmap representing the blanking state of each base station, bit corresponding to base station 3 is set to be 1 represents that base station 3 is blanked, and bit corresponding to base station 1 and base station 2 is set to be 0 represents that these base stations are not blanked. Information bit representing whether or not to receive the scheduling information from a base station as a transmitter is set to be 1 represents that the scheduling information is received from the base station, and an associated information bit carrying a base station identifier is null. Information bit representing whether or not to allow the scheduling to be performed for a base station as a receiver is set to be 0 represents that the scheduling is not allowed to be performed for the base station, and an associated information bit carrying a base station identifier is null. The bitmap about the available (or unavailable) precoding matrix corresponding to each base station identifier is null, i.e., no available (or unavailable) precoding matrix is indicated.

In the message for transmitting the scheduling privilege information from the CCN to base station 3, information bit representing whether or not to allow the single-cell transmission of a current base station is set to be 0 represents that base station 3 may not perform the single-cell transmission as indicated by the CCN. In the bitmap representing the blanking state of each base station, bit corresponding to base station 3 is set to be 1 represents that base station 3 is blanked, and bit corresponding to base station 1 and base station 2 is set to be 0 represents that these base stations are not blanked. Information bit representing whether or not to receive the scheduling information from a base station as a transmitter is set to be 0 represents that the scheduling information is not received from the base station, and an associated information bit carrying a base station identifier is null. Information bit representing whether or not to allow the scheduling to be performed for a base station as a receiver is set to be 0 represents that the scheduling is not allowed to be performed for the base station, and an associated information bit carrying a base station identifier is null. The bitmap about the available (or unavailable) precoding matrix corresponding to each base station identifier is null, i.e., no available (or unavailable) precoding matrix is indicated.

Step 330: acquiring the scheduling privilege information by each base station.

To be specific, base station 1 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is allowed, reads the bitmap representing the blanking state of each base station so as to determine that base station 3 is to be blanked during the transmission, reads the information bit representing whether or not to receive the scheduling information from the base station as a transmitter so as to determine that the scheduling information is not received from the base station, reads the information bit representing whether or not to allow the scheduling for the base station as a receiver so as to determine that the scheduling is allowed to be performed for base station 2, and reads the valid time information so as to determine that the time desired for transmitting the downlink data to the terminal falls within the valid time period.

Base station 2 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is not allowed, reads the bitmap representing the blanking state of each base station so as to determine that base station 3 is to be blanked during the transmission, reads the information bit representing whether or not to receive the scheduling information from the base station as a transmitter as will as the associated information bit carrying the base station identifier so as to determine that the scheduling information is received from base station 1, reads the information bit representing whether or not to allow the scheduling for the base station as a receiver so as to determine that the scheduling is not allowed to be performed for base station 2, and reads the valid time information so as to determine that the time desired for transmitting the downlink data to the terminal falls within the valid time period.

Base station 3 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is not allowed, reads the bitmap representing the blanking state of each base station so as to determine that base station 3 is to be blanked during the transmission, reads the information bit representing whether or not to receive the scheduling information from the base station as a transmitter so as to determine that the scheduling information is not received from the base station, and reads the information bit representing whether or not to allow the scheduling for the base station as a receiver so as to determine that the scheduling is not allowed to be performed for the base station.

Step 340a: scheduling the single-cell transmission of UE2 for base station 1 in accordance with the received scheduling privilege information as well as the latest CSI reported by UE1 and UE2, not scheduling the transmission to UE that is connected to base station 1 for base station 2, and not notifying any scheduling information to base station 2.

Step 340b: within the valid time period, not receiving, by base station 2, the scheduling information from base station 1, determining that the voluntary scheduling is required, and scheduling the DPB transmission to UE3 in accordance with the blanking state of each base station as well as the latest CSI reported by UE3 and UE4.

Step 340c: not scheduling, by base station 3, any Physical Downlink Shared Channel (PDSCH) transmission for the current base station over the downlink time-frequency resource.

Step 350: performing, by base station 1, the single-cell transmission to UE2 over the downlink time-frequency resource in accordance with the scheduling result, performing, by base station 3, the DPB transmission to UE3 over the downlink time-frequency resource in accordance with the scheduling result, and enabling base station 3 to be in the blanking state over the downlink time-frequency resource.

CoMP transmission among base stations in different cells is taken as an example hereinafter. The coordinated-transmission is performed among three base stations in a system, i.e., base station 1, base station 2 and base station 3. Each base station is provided with three terminals, i.e., UE1 (CoMP UE, a measurement set of which includes base station 1, base station 2, and base station 3), UE2 (CoMP UE, a measurement set of which includes base station 1, base station 2, and base station 3) and UE3 (CoMP UE, a measurement set of which includes base station 1 and base station 2) for base station 1, UE4 for base station 2, and UE5 (CoMP UE, a measurement set of which includes base station 1 and base station 3) for base station 3.

Base stations 1-3 receive and cache service data transmitted from the core network to the terminals, respectively, and report the service data to the CCN in a semi-static manner.

Figure 4:
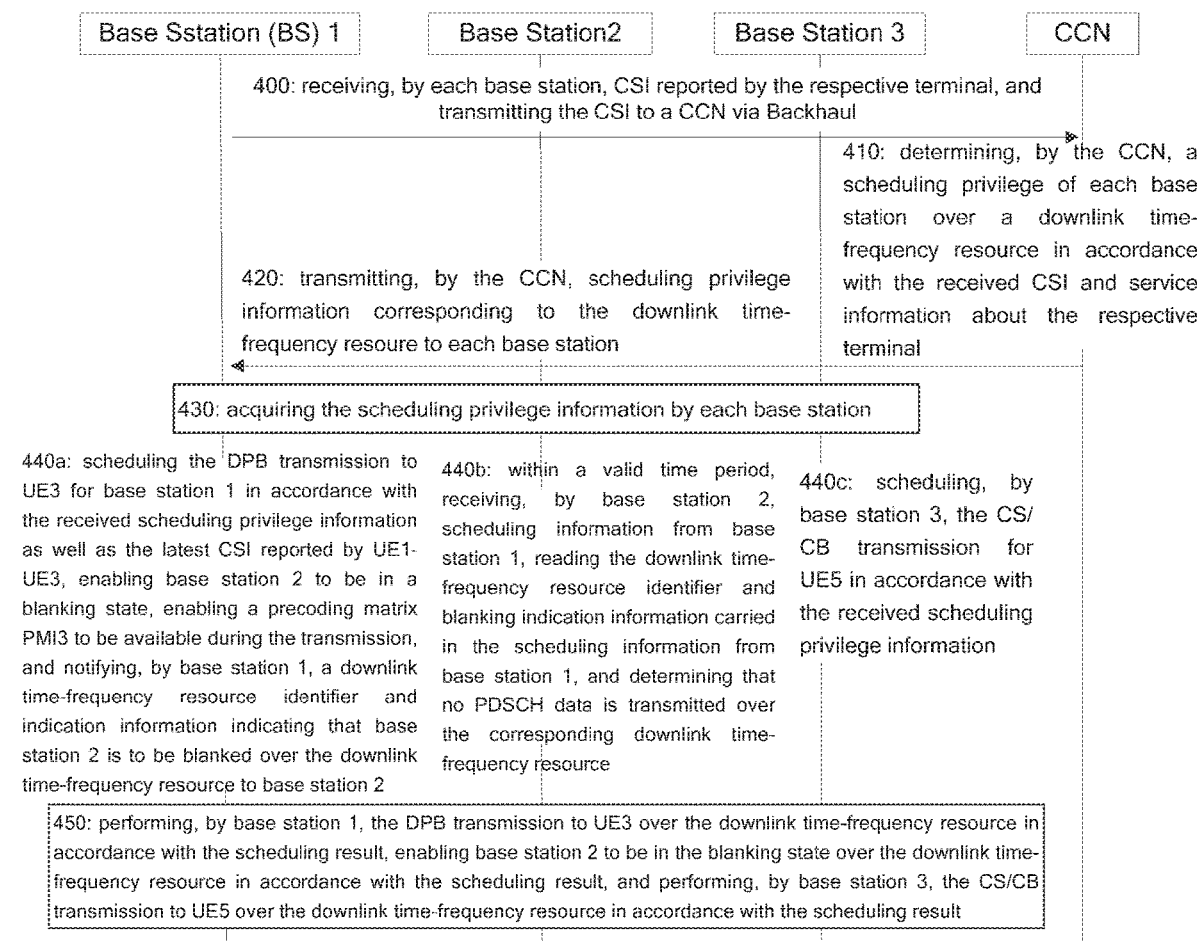
FIG. 4 is still yet another flow chart of the scheduling method for downlink coordinated-transmission according to one embodiment of the present disclosure.

With respect to a certain downlink time-frequency resource, as shown in FIG. 4, a corresponding CoMP scheduling mode may include the following steps.

Step 400: receiving, by each base station, the CSI reported by the respective terminal, and transmitting the CSI to the CCN via Backhaul. Alternatively, each base station further receives the other channel measurement information reported by the respective terminal and transmits it to the CCN via Backhaul, or measures or counts channels and transmits channel measurement/statistic information to the CCN via Backhaul.

Step 410: determining, by the CCN, a scheduling privilege of each base station over the downlink time-frequency resource in accordance with the received CSI and the service information about the respective terminal. When the other channel measurement/statistic information is further reported by the base station, the CCN may determine the scheduling privilege of each base station over the downlink time-frequency resource in accordance with the CSI, the other channel measurement/statistic information and the service information about the terminal.

To be specific, the CCN pre-schedules interference avoidance for base station 1, and the precoding matrices PMI1, PMI2 are unavailable for base station 1. In addition, the CCN further pre-schedules the single-cell transmission to UE1 for base station 1, pre-schedules the DPS transmission to UE2 for base station 2, and pre-schedules CS/CB transmission to UE5 for base station 3. Base station 1 is interference-avoided.

The pre-scheduling mode is substantially identical to the CCN scheduling, except that the CCN does not transmit the scheduling information generated at the pre-scheduling procedure to each base station, and instead, it determines the scheduling privilege of each base station in accordance with a pre-scheduling result and then transmits the scheduling privilege information to each base station.

To be specific, in accordance with the above pre-scheduling results, the CCN determines that base station 1 may perform the single-cell transmission over the downlink time-frequency resource but interference avoidance is required, that the DPS transmission may be performed between base station 1 and base station 2 and the transmission point is dynamically selected by base station 1 (i.e., base station 1 is allowed to perform the scheduling for base station 2), and that base station 3 is in the blanking state.

Step 420: transmitting, by the CCN, the scheduling privilege information corresponding to the downlink time-frequency resource to each base station. The message format for transmitting the scheduling privilege information is the same as that mentioned above.

To be specific, in the message for transmitting the scheduling privilege information from the CCN to base station 1, information bit representing whether or not to allow the single-cell transmission of a current base station is set to be 1 represents that base station 1 may perform the single-cell transmission as indicated by the CCN. In the bitmap representing the blanking state of each base station, bit corresponding to base stations 1-3 is set to be 0 represents that these base stations are not blanked. Information bit representing whether or not to receive the scheduling information from a base station as a transmitter is set to be 0 represents that the scheduling information is not received from the base station, and an associated information bit carrying a base station identifier is null. Information bit representing whether or not to allow the scheduling to be performed for a base station as a receiver is set to be 1 represents that the scheduling is allowed to be performed for the base station, and an associated information bit carrying a base station identifier carriers an identifier of base station 2. In the bitmap representing the unavailable precoding matrix corresponding to an identifier of base station 1, the bit corresponding to PMI1 and PMI2 is set to be 1 represents these precoding matrices are unavailable.

In the message for transmitting the scheduling privilege information from the CCN to base station 2, information bit representing whether or not to allow the single-cell transmission of a current base station is set to be 0 represents that base station 2 may not perform the single-cell transmission as indicated by the CCN. In the bitmap representing the blanking state of each base station, bit corresponding to base stations 1-3 is set to be 0 represents that these base stations are not blanked. Information bit representing whether or not to receive the scheduling information from a base station as a transmitter is set to be 1 represents that the scheduling information is received from the base station, and an associated information bit carrying a base station identifier carries an identifier of base station 1. Information bit representing whether or not to allow the scheduling to be performed for a base station as a receiver is set to be 0 represents that the scheduling is not allowed to be performed for the base station, and an associated information bit carrying a base station identifier is null. In the bitmap representing the unavailable precoding matrix corresponding to an identifier of base station 1, the bit corresponding to PMI1 and PMI2 is set to be 1 represents these precoding matrices are unavailable.

In the message for transmitting the scheduling privilege information from the CCN to base station 3, information bit representing whether or not to allow the single-cell transmission of a current base station is set to be 1 represents that base station 1 may perform the single-cell transmission as indicated by the CCN. In the bitmap representing the blanking state of each base station, bit corresponding to base stations 1-3 is set to be 0 represents that these base stations are not blanked. Information bit representing whether or not to receive the scheduling information from a base station as a transmitter is set to be 0 represents that the scheduling information is not received from the base station, and an associated information bit carrying a base station identifier is null. Information bit representing whether or not to allow the scheduling to be performed for a base station as a receiver is set to be 0 represents that the scheduling is not allowed to be performed for the base station, and an associated information bit carrying a base station identifier is null. In the bitmap representing the unavailable precoding matrix corresponding to an identifier of base station 1, the bit corresponding to PMI1 and PMI2 is set to be 1 represents these precoding matrices are unavailable.

Step 430: acquiring the scheduling privilege information by each base station.

To be specific, base station 1 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is allowed, reads the bitmap representing the blanking state of each base station so as to determine that no base station is to be blanked, reads the information bit representing whether or not to receive the scheduling information from the base station as a transmitter so as to determine that the scheduling information is not received from the base station, reads the information bit representing whether or not to allow the scheduling for the base station as a receiver so as to determine that the scheduling is allowed to be performed for base station 2, reads the bitmap representing the unavailable precoding matrix corresponding to the current base station so as to determine that PMI1 and PMI2 are unavailable during the transmission, and reads the valid time information so as to determine that the time desired for transmitting the downlink data to the terminal falls within the valid time period.

Base station 2 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is not allowed, reads the bitmap representing the blanking state of each base station so as to determine that no base station is to be blanked, reads the information bit representing whether or not to receive the scheduling information from the base station as a transmitter as well as the associated information bit carrying a base station identifier so as to determine that the scheduling information is received from base station 1, reads the information bit representing whether or not to allow the scheduling for the base station as a receiver so as to determine that the scheduling is not allowed to be performed for the base station, reads the bitmap representing the unavailable precoding matrix corresponding to the current base station so as to determine that PMI1 and PMI2 are unavailable for base station 1 during the transmission, and reads the valid time information so as to determine that the time desired for transmitting the downlink data to the terminal falls within the valid time period.

Base station 3 receives the scheduling privilege information from the CCN, reads the downlink time-frequency resource identifier contained therein so as to determine the downlink time-frequency resource corresponding to the scheduling privilege information, reads the information bit representing whether or not to allow the single-cell transmission of the current base station so as to determine that the single-cell transmission of the current base station is allowed, reads the bitmap representing the blanking state of each base station so as to determine that no base station is to be blanked, reads the information bit representing whether or not to receive the scheduling information from the base station as a transmitter so as to determine that the scheduling information is not received from the base station, reads the information bit representing whether or not to allow the scheduling for the base station as a receiver so as to determine that the scheduling is not allowed to be performed for the base station, reads the bitmap representing the unavailable precoding matrix corresponding to the current base station so as to determine PMI1 and PMI2 are unavailable for base station 1 during the transmission, and reads the valid time information so as to determine that the time desired for transmitting the downlink data to the terminal falls within the valid time period.

Step 440a: scheduling the DPB transmission to UE3 for base station 1 in accordance with the received scheduling privilege information as well as the latest CSI reported by UE1-UE3, enabling base station 2 to be in the blanking state, enabling the precoding matrix PMI3 to be available during the transmission, and notifying, by base station 1, the downlink time-frequency resource identifier and indication information indicating that base station 2 is to be blanked over the downlink time-frequency resource to base station 2.

Step 440b: within the valid time period, receiving, by base station 2, the scheduling information from base station 1, reading the downlink time-frequency resource identifier and blanking indication information carried in the scheduling information from base station 1, and determining that no PDSCH data is transmitted over the corresponding downlink time-frequency resource.

Step 440c: scheduling, by base station 3, the CS/CB transmission for UE5 in accordance with the received scheduling privilege information.

Step 450: performing, by base station 1, the DPB transmission to UE3 over the downlink time-frequency resource in accordance with the scheduling result, enabling base station 2 to be in the blanking state over the downlink time-frequency resource in accordance with the scheduling result, and performing, by base station 3, the CS/CB transmission to UE5 over the downlink time-frequency resource in accordance with the scheduling result.

Figure 5:
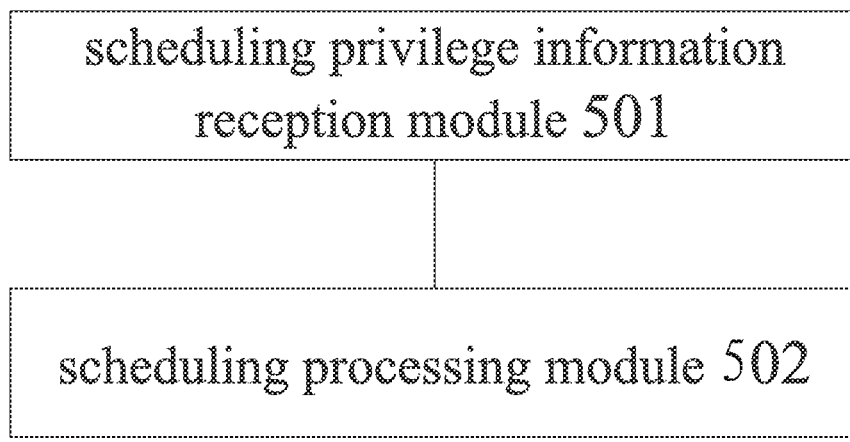
FIG. 5 is a schematic view showing a coordinated-transmission node according to one embodiment of the present disclosure.

Based on an identical inventive concept, the present disclosure further provides in some embodiments a coordinated-transmission node for downlink coordinated-transmission which, as shown in FIG. 5, includes:

a scheduling privilege information reception module 501 configured to receive scheduling privilege information corresponding to a downlink time-frequency resource from a CCN, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals connected to coordinated-transmission nodes; and a scheduling processing module 502 configured to performing the scheduling in accordance with the received scheduling privilege information and the latest CSI reported by the terminal.

Alternatively, the scheduling processing module 502 is specifically configured to:

determine the downlink time-frequency resource corresponding to a downlink time-frequency resource identifier in accordance with the downlink time-frequency resource identifier contained in the received scheduling privilege information;

determine that the terminal is allowed to be scheduled in accordance with indication information contained in the received scheduling privilege information and indicating that the terminal is allowed to be scheduled; and schedule the terminal over the downlink time-frequency resource corresponding to the downlink time-frequency resource identifier in accordance with the latest CSI reported by the terminal.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The scheduling processing module 502 is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the scheduling processing module 502 is specifically configured to:

determine interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determine a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the scheduling processing module 502 is specifically configured to:

determine a downlink time-frequency resource corresponding to a downlink time-frequency resource identifier in accordance with the downlink time-frequency resource identifier contained in the received scheduling privilege information;

determine that a further coordinated-transmission node is allowed to be scheduled in accordance with indication information contained in the received scheduling privilege information and indicating that the scheduling is allowed to be performed for the further coordinated-transmission node;

determine whether or not the terminal is to be scheduled over the downlink time-frequency resource corresponding to the downlink time-frequency resource identifier in accordance with the latest CSI reported by the terminal, the further coordinated-transmission node being contained in a measurement set of the terminals; and when it is determined that the terminal is to be scheduled over the downlink time-frequency resource corresponding to the downlink time-frequency resource identifier, schedule the terminal over the downlink time-frequency resource corresponding to the downlink time-frequency resource identifier, and transmitting scheduling information to the further coordinated-transmission node.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The scheduling processing module 502 is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the scheduling processing module 502 is specifically configured to:

determine interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determine a precoding matrix available for the further coordinated-transmission node during the downlink transmission in accordance with the indication information about the precoding matrix in which the use of the interference-avoided coordinated-transmission node is limited.

Alternatively, the coordinated-transmission node further includes a valid time determination module configured to receive valid time information corresponding to the scheduling privilege information from the CCN, and determine whether or not a time domain of the downlink time-frequency resource falls within a time period indicated by the valid time information in accordance with the valid time information. When it is determined that the time domain of the downlink time-frequency resource falls within the time period indicated by the valid time information, the scheduling processing module 502 performs the scheduling in accordance with the received scheduling privilege information and the latest CSI reported by the terminal.

Figure 6:
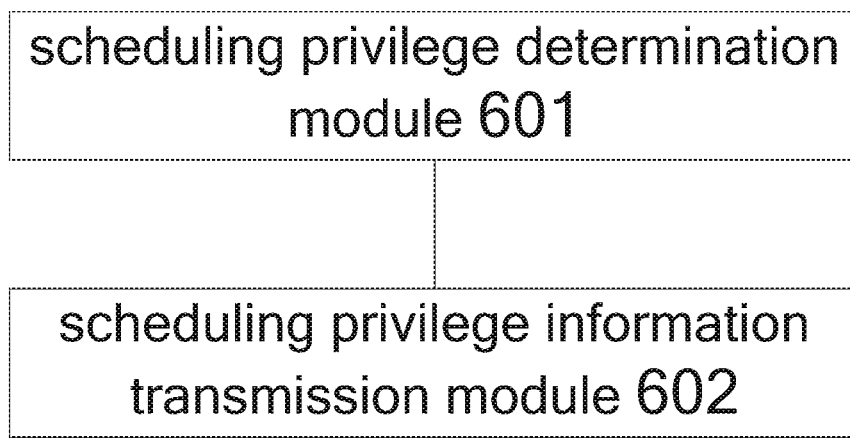
FIG. 6 is a schematic view showing a CCN according to one embodiment of the present disclosure.

Based on an identical inventive concept, the present disclosure further provides in some embodiments a CCN for downlink coordinated-transmission which, as shown in FIG. 6, includes:

a scheduling privilege determination module 601 configured to determine a scheduling privilege of each coordinated-transmission node over a downlink time-frequency resource in accordance with channel information about a terminal that is connected to the coordinated-transmission node; and a scheduling privilege information transmission module 602 configured to transmitting scheduling privilege information corresponding to the downlink time-frequency resource to the coordinated-transmission node, so that the coordinated-transmission node performs the scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the scheduling privilege determination module 601 is specifically configured to:

for a coordinated-transmission node where single-cell transmission to the terminal over the downlink time-frequency resource has been determined in accordance with the channel information about the terminal that is connected to the coordinated-transmission node, determine its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determine its scheduling privilege over the downlink time-frequency resource as allowing the scheduling to be performed for a further coordinated-transmission node, and determine a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determine its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determine its scheduling privilege over the downlink time-frequency resource as limiting the use of a precoding matrix during the transmission.

Alternatively, when the scheduling privilege of the coordinated-transmission node over the downlink time-frequency resource has been determined as allowing the terminal that is connected to the coordinated-transmission node to be scheduled, the scheduling privilege information transmitted to the coordinated-transmission node includes a downlink time-frequency resource identifier and indication information indicating that the terminal is allowed to be scheduled.

Alternatively, when the scheduling privilege of the coordinated-transmission node over the downlink time-frequency resource has been determined as allowing the scheduling to be performed for the further coordinated-transmission node, the scheduling privilege information transmitted to the coordinated-transmission node includes a downlink time-frequency resource identifier and indication information indicating that the scheduling is allowed to be performed for the further coordinated-transmission node.

Alternatively, when the scheduling privilege of the coordinated-transmission node over the downlink time-frequency resource has been determined as receiving the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

Alternatively, the scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

The CCN further includes a valid time transmission module configured to transmit valid time information corresponding to the scheduling privilege information to the coordinated-transmission node.

The structure of the coordinated-transmission node for downlink coordinated-transmission and the processing mode thereof will be described hereinafter in conjunction with a preferred hardware structure.

Figure 7:
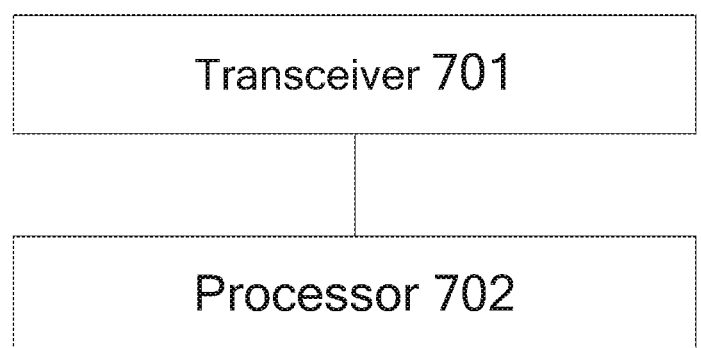
FIG. 7 is another schematic view showing the coordinated-transmission node according to one embodiment of the present disclosure.

As shown in FIG. 7, the coordinated-transmission node includes a transceiver 701 and at least one processor 702 connected to the transceiver 701. The transceiver 701 is configured to receive scheduling privilege information corresponding to a downlink time-frequency resource from a CCN, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals of coordinated-transmission nodes. The processor 702 is configured to perform the scheduling in accordance with the scheduling privilege information received by the transceiver and the latest CSI reported by the terminal Alternatively, the processor 702 is specifically configured to:

determine the downlink time-frequency resource corresponding to a downlink time-frequency resource identifier in accordance with the downlink time-frequency resource identifier contained in the received scheduling privilege information received by the transceiver 701;

determine that the terminal is allowed to be scheduled in accordance with indication information contained in the scheduling privilege information received by the transceiver 701 and indicating that the terminal is allowed to be scheduled; and schedule the terminal over the downlink time-frequency resource corresponding to the downlink time-frequency resource identifier in accordance with the latest CSI reported by the terminal.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The processor 702 is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the processor 702 is specifically configured to:

determine interference of the other coordinated-transmission nodes on the coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the coordinated-transmission node over the downlink time-frequency resource corresponding to the downlink time-frequency resource identifier; and determine a precoding matrix available for the coordinated-transmission node during the downlink transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the processor 702 is specifically configured to:

determine a downlink time-frequency resource corresponding to a downlink time-frequency resource identifier in accordance with the downlink time-frequency resource identifier contained in the scheduling privilege information received by the transceiver 701;

determine that a further coordinated-transmission node is allowed to be scheduled in accordance with indication information contained in the scheduling privilege information received by the transceiver 701 and indicating that the scheduling is allowed to be performed for the further coordinated-transmission node;

determine whether or not the terminal is to be scheduled over the downlink time-frequency resource corresponding to the downlink time-frequency resource identifier in accordance with the latest CSI reported by the terminal, the further coordinated-transmission node being contained in a measurement set of the terminals; and when it is determined that the terminal is to be scheduled over the downlink time-frequency resource corresponding to the downlink time-frequency resource identifier, schedule the terminal over the downlink time-frequency resource corresponding to the downlink time-frequency resource identifier, and trigger the transceiver to transmit scheduling information to the further coordinated-transmission node.

Alternatively, the scheduling privilege information further includes indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which the use of the interference-avoided coordinated-transmission node is limited.

The processor 702 is specifically configured to schedule the terminal over the downlink time-frequency resource corresponding to the downlink time-frequency resource identifier in accordance with the latest CSI reported by the terminal, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

Alternatively, the processor 702 is specifically configured to:

determine interference of the other coordinated-transmission nodes on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determine a transmission mode for the terminal over the downlink time-frequency resource in accordance with the latest CSI reported by the terminal and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the terminal over the downlink time-frequency resource, determine a precoding matrix available for the further coordinated-transmission node during the downlink transmission in accordance with the indication information about the precoding matrix in which the use of the interference-avoided coordinated-transmission node is limited.

Alternatively, the transceiver 701 is further configured to receive valid time information corresponding to the scheduling privilege information from the CCN. The processor 702 is further configured to determine whether or not a time domain of the downlink time-frequency resource falls within a time period indicated by the valid time information in accordance with the valid time information, and when it is determined that the time domain of the downlink time-frequency resource falls within the time period indicated by the valid time information, perform the scheduling in accordance with the received scheduling privilege information and the latest CSI reported by the terminal.

The structure of the CCN for downlink coordinated-transmission and the processing mode thereof will be described hereinafter in conjunction with a preferred hardware structure.

Figure 8:
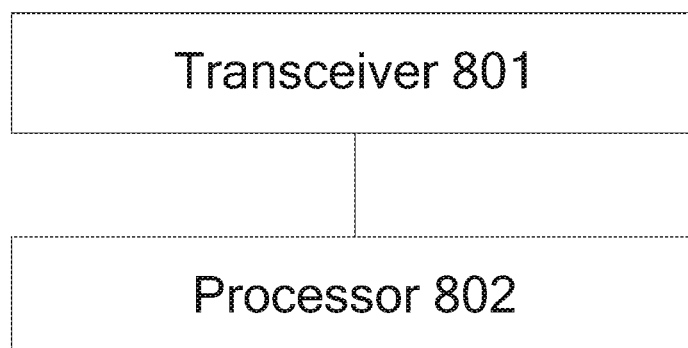
FIG. 8 is another schematic view showing the CCN according to one embodiment of the present disclosure.

As shown in FIG. 8, the CCN includes a transceiver 801 and at least one processor 802 connected to the transceiver 801. The processor 802 is configured to determine a scheduling privilege of each coordinated-transmission node over a downlink time-frequency resource in accordance with channel information about a terminal that is connected to the coordinated-transmission node. The transceiver 801 is configured to transmit scheduling privilege information corresponding to the downlink time-frequency resource to the coordinated-transmission node, so that the coordinated-transmission node performs the scheduling in accordance with the received scheduling privilege information and the latest CSI reported by the terminal, the scheduling privilege information corresponding to the downlink time-frequency resource indicating the scheduling privilege of the coordinated-transmission node over the downlink time-frequency resource.

Alternatively, the processor 802 is specifically configured to:

for a coordinated-transmission node where single-cell transmission to the terminal over the downlink time-frequency resource has been determined in accordance with the channel information about the terminal that is connected to the coordinated-transmission node, determine its scheduling privilege over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determine its scheduling privilege over the downlink time-frequency resource as allowing the scheduling to be performed for a further coordinated-transmission node, and determine a scheduling privilege of the further coordinated-transmission node over the downlink time-frequency resource as receiving scheduling information from the coordinated-transmission node, the further coordinated-transmission node being a coordinated-transmission node in a measurement set of the terminals;

for a coordinated-transmission node that has been determined to be blanked over the downlink time-frequency resource in accordance with the channel information about the terminal that is connected to the coordinated-transmission node, determine its scheduling privilege over the downlink time-frequency resource as being blanked; and for a coordinated-transmission node that has been determined to be interference-avoided over the downlink time-frequency resource in accordance with the channel information about the terminal that is connected to the coordinated-transmission node, determine its scheduling privilege over the downlink time-frequency resource as limiting the use of a precoding matrix during the transmission.

Alternatively, when the scheduling privilege of the coordinated-transmission node over the downlink time-frequency resource has been determined as allowing the terminal that is connected to the coordinated-transmission node to be scheduled, the scheduling privilege information transmitted to the coordinated-transmission node includes a downlink time-frequency resource identifier and indication information indicating that the terminal is allowed to be scheduled.

Alternatively, when the scheduling privilege of the coordinated-transmission node over the downlink time-frequency resource has been determined as allowing the scheduling to be performed for the further coordinated-transmission node, the scheduling privilege information transmitted to the coordinated-transmission node includes a downlink time-frequency resource identifier and indication information indicating that the scheduling is allowed to be performed for the further coordinated-transmission node.

Alternatively, when the scheduling privilege of the coordinated-transmission node over the downlink time-frequency resource has been determined as receiving the scheduling information from the further coordinated-transmission node, the scheduling privilege information transmitted to the coordinated-transmission node includes a downlink time-frequency resource identifier and indication information indicating the reception of the scheduling information from the further coordinated-transmission node.

The scheduling privilege information further includes indication information about a blanked coordinated-transmission node over the downlink time-frequency resource, indication information about an interference-avoided coordinated-transmission node over the downlink time-frequency resource, and indication information about a precoding matrix in which the use of the interference-avoided coordinated-transmission node is limited.

Alternatively, the transceiver 801 is further configured to transmit valid time information corresponding to the scheduling privilege information to the coordinated-transmission node.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further improvements and modifications without departing from the spirit of the present disclosure. If these improvements and modifications fall within the scope of the appended claims and the equivalents thereof, the present disclosure also intends to include them.

What is claimed is:

1. A scheduling method for downlink coordinated-transmission, comprising steps of:
   receiving, by a first coordinated-transmission node, from a Central Coordination Node (CCN), one message comprising scheduling privilege information corresponding to a downlink time-frequency resource and valid time information corresponding to the scheduling privilege information, the scheduling privilege information corresponding to the downlink time-frequency resource indicating a scheduling privilege of the first coordinated-transmission node over the downlink time-frequency resource, the scheduling privilege of the first coordinated-transmission node over the downlink time-frequency resource being determined by the central coordination node in accordance with channel information about terminals connected to coordinated-transmission nodes, the valid time information indicating a time period during which the downlink time-frequency resource is valid; and
   performing, by the first coordinated-transmission node, scheduling in accordance with the received scheduling privilege information and latest Channel State Information (CSI) reported by a respective one of the terminals,
   wherein the scheduling privilege information corresponding to the downlink time-frequency resource includes a downlink time-frequency resource identifier and indication information corresponding to the downlink time-frequency identifier;
   the indication information is at least one of: indication information indicating that one of the terminals is allowed to be scheduled, and indication information indicating that the scheduling is allowed to be performed for a further coordinated-transmission node;
   the scheduling privilege information further comprises indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which use of the interference-avoided coordinated-transmission node is limited; and
   the indication information about the blanked coordinated-transmission node is bitmap information indicating the blanked coordinated-transmission node, and the blanked coordinated-transmission node is a base station or a Remote Radio Head (RRH) belonging to the base station.

2. The scheduling method according to claim 1, wherein the step of performing, by the first coordinated-transmission node, scheduling in accordance with the received scheduling privilege information and the latest CSI reported by the respective one of the terminals comprises:
   determining, in accordance with the downlink time-frequency resource identifier contained in the received scheduling privilege information, the downlink time-frequency resource corresponding to the downlink time-frequency resource identifier;
   determining that the respective one of the terminals is allowed to be scheduled in accordance with the indication information contained in the received scheduling privilege information and indicating that the respective one of the terminals is allowed to be scheduled; and
   scheduling the respective one of the terminals over the downlink time-frequency resource corresponding to the downlink time-frequency resource identifier in accordance with the latest CSI reported by the respective one of the terminals.

3. The scheduling method according to claim 2, wherein the step of scheduling the respective one of the terminals over the downlink time-frequency resource corresponding to the downlink time-frequency resource identifier in accordance with the latest CSI reported by the respective one of the terminals comprises:
   scheduling the respective one of the terminals over the downlink time-frequency resource corresponding to the downlink time-frequency resource identifier in accordance with the latest CSI reported by the respective one of the terminals, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

4. The scheduling method according to claim 3, wherein the step of scheduling the respective one of the terminals over the downlink time-frequency resource corresponding to the downlink time-frequency resource identifier in accordance with the latest CSI reported by the respective one of the terminals, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited comprises:
   determining interference of other coordinated-transmission nodes being other than the first coordinated-transmission node on the first coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;
   determining a transmission mode for the respective one of the terminals over the downlink time-frequency resource in accordance with the latest CSI reported by respective one of the terminals and the interference of the other coordinated-transmission nodes on the first coordinated-transmission node over the downlink time-frequency resource corresponding to the downlink time-frequency resource identifier; and determining a precoding matrix available for the first coordinated-transmission node during the downlink coordinated-transmission in accordance with the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

5. The scheduling method according to claim 1, wherein the step of performing, by the first coordinated-transmission node, scheduling in accordance with the received scheduling privilege information and the latest CSI reported by the respective one of the terminals comprises:

determining, in accordance with the downlink time-frequency resource identifier contained in the received scheduling privilege information, the downlink time-frequency resource corresponding to the downlink time-frequency resource identifier;

determining that the further coordinated-transmission node is allowed to be scheduled in accordance with the indication information contained in the received scheduling privilege information and indicating that the further coordinated-transmission node is allowed to be scheduled;

determining, in accordance with the latest CSI reported by the respective one of the terminals, whether or not the respective one of the terminals is to be scheduled over the downlink time-frequency resource corresponding to the downlink time-frequency resource identifier, the further coordinated-transmission node being contained in a measurement set of the terminals; and upon determining that the respective one of the terminals is to be scheduled over the downlink time-frequency resource corresponding to the downlink time-frequency resource identifier, scheduling the respective one of the terminals over the downlink time-frequency resource corresponding to the downlink time-frequency resource identifier, and transmitting scheduling information to the further coordinated-transmission node.

6. The scheduling method according to claim 5, wherein the step of scheduling the respective one of the terminals over the downlink time-frequency resource corresponding to the downlink time-frequency resource identifier comprises:

scheduling the respective one of the terminals over the downlink time-frequency resource corresponding to the downlink time-frequency resource identifier in accordance with the latest CSI reported by the respective one of the terminals, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited.

7. The scheduling method according to claim 6, wherein the step of scheduling the respective one of the terminals over the downlink time-frequency resource corresponding to the downlink time-frequency resource identifier in accordance with the latest CSI reported by the respective one of the terminals, the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited comprises:

determining interference of other coordinated-transmission nodes being other than the further coordinated-transmission node on the further coordinated-transmission node over the downlink time-frequency resource corresponding to the downlink time-frequency resource identifier in accordance with the indication information about the blanked coordinated-transmission node over the downlink time-frequency resource corresponding to the downlink time-frequency resource identifier, the indication information about the interference-avoided coordinated-transmission node over the downlink time-frequency resource corresponding to the downlink time-frequency resource identifier, and the indication information about the precoding matrix in which the use of the interference-avoided coordinated-transmission node is limited;

determining a transmission mode for the respective one of the terminals over the downlink time-frequency resource in accordance with the latest CSI reported by the respective one of the terminals and the interference of the other coordinated-transmission nodes on the further coordinated-transmission node over the downlink time-frequency resource corresponding to the downlink time-frequency resource identifier; and when the determined transmission mode is that the transmission is performed from the further coordinated-transmission node to the respective one of the terminals over the downlink time-frequency resource, determining the precoding matrix available for the further coordinated-transmission node during the downlink coordinated-transmission in accordance with the indication information about the precoding matrix in which the use of the interference-avoided coordinated-transmission node is limited.

8. The scheduling method according to claim 1, wherein prior to performing, by the first coordinated-transmission node, scheduling in accordance with the received scheduling privilege information and the latest CSI reported by the respective one of the terminals, the scheduling method further comprises:

determining, by the first coordinated-transmission node in accordance with the valid time information, whether or not a time domain of the downlink time-frequency resource falls within the time period indicated by the valid time information, and upon determining that the time domain of the downlink time-frequency resource falls within the time period indicated by the valid time information, performing the scheduling in accordance with the received scheduling privilege information and the latest CSI reported by the respective one of the terminals.

9. A scheduling method for downlink coordinated-transmission, comprising steps of:

determining, by a Central Coordination Node (CCN), a scheduling privilege of a coordinated-transmission node over a downlink time-frequency resource in accordance with channel information about a terminal that is connected to the coordinated-transmission node; and transmitting, by the CCN, one message comprising scheduling privilege information corresponding to the downlink time-frequency resource and valid time information corresponding to the scheduling privilege information to the coordinated-transmission node, so that the coordinated-transmission node performs scheduling in accordance with the received scheduling privilege information and latest Channel State Information (CSI) reported by the terminal, the scheduling privilege information corresponding to the downlink time-frequency resource indicating the scheduling privilege of the coordinated-transmission node over the downlink time-frequency resource, wherein the valid time information indicates a time period during which the downlink time-frequency resource is valid, the scheduling privilege information corresponding to the downlink time-frequency resource includes a downlink time-frequency resource identifier and indication information corresponding to the downlink time-frequency identifier;

the indication information is at least one of: indication information indicating that the terminal is allowed to be scheduled, and indication information indicating that the scheduling is allowed to be performed for a further coordinated-transmission node;

the scheduling privilege information further comprises indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which use of the interference-avoided coordinated-transmission node is limited; and the indication information about the blanked coordinated-transmission node is bitmap information indicating the blanked coordinated-transmission node, and the blanked coordinated-transmission node is a base station or a RRH belonging to the base station.

10. The scheduling method according to claim 9, wherein the step of determining, by the CCN, the scheduling privilege of the coordinated-transmission node over the downlink time-frequency resource in accordance with the channel information about the terminal that is connected to the coordinated-transmission node comprises:

for the coordinated-transmission node where single-cell transmission to the terminal over the downlink time-frequency resource has been determined in accordance with the channel information about the terminal that is connected to the coordinated-transmission node, determining the scheduling privilege of the coordinated-transmission node over the downlink time-frequency resource as allowing the terminal to be scheduled;

for the coordinated-transmission node where the selection or blanking of dynamic transmission points by the terminal over the downlink time-frequency resource has been determined in accordance with the channel information about the terminal that is connected to the coordinated-transmission node, determining the scheduling privilege of the coordinated-transmission node over the downlink time-frequency resource as allowing the scheduling to be performed for a further coordinated-transmission node, and determining a scheduling privilege of the further coordinated-transmission node over the downlink time-frequency resource to be receiving scheduling information from the coordinated-transmission node, the further coordinated-transmission node being a coordinated-transmission node in a measurement set of the terminal;

for the coordinated-transmission node that has been determined to be blanked over the downlink time-frequency resource in accordance with the channel information about the terminal that is connected to the coordinated-transmission node, determining the scheduling privilege of the coordinated-transmission node over the downlink time-frequency resource as being blanked; and for the coordinated-transmission node that has been determined to be interference-avoided over the downlink time-frequency resource in accordance with the channel information about the terminal that is connected to the coordinated-transmission node, determining the scheduling privilege of the coordinated-transmission node over the downlink time-frequency resource as limiting use of a precoding matrix during the downlink coordinated-transmission.

11. The scheduling method according to claim 10, wherein when the scheduling privilege of the coordinated-transmission node over the downlink time-frequency resource has been determined to be receiving the scheduling information from the further coordinated-transmission node, the scheduling privilege information transmitted to the coordinated-transmission node comprises the downlink time-frequency resource identifier and indication information indicating the receiving of the scheduling information from the further coordinated-transmission node.

12. A coordinated-transmission node for downlink coordinated-transmission, comprising: a processor, a memory and a transceiver, wherein the processor is configured to read a program stored in the memory to:

receive, from a Central Coordination Node (CCN) through the transceiver, one message comprising scheduling privilege information corresponding to a downlink time-frequency resource and valid time information corresponding to the scheduling privilege information, the scheduling privilege information corresponding to the downlink time-frequency resource indicating a scheduling privilege of the coordinated-transmission node over the downlink time-frequency resource, the scheduling privilege of the coordinated-transmission node over the downlink time-frequency resource being determined by the central coordination node in accordance with channel information about terminals connected to coordinated-transmission nodes, the valid time information indicating a time period during which the downlink time-frequency resource is valid; and perform scheduling in accordance with the received scheduling privilege information and latest Channel State Information (CSI) reported by a respective one of the terminals, the transceiver is configured to receive and transmit data, and the memory is capable of storing therein data for operation of the processor, wherein the scheduling privilege information corresponding to the downlink time-frequency resource includes a downlink time-frequency resource identifier and indication information corresponding to the downlink time-frequency identifier;

the indication information is at least one of: indication information indicating that one of the terminals is allowed to be scheduled, and indication information indicating that the scheduling is allowed to be performed for a further coordinated-transmission node;

the scheduling privilege information further comprises indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which use of the interference-avoided coordinated-transmission node is limited; and the indication information about the blanked coordinated-transmission node is bitmap information indicating the blanked coordinated-transmission node, and the blanked coordinated-transmission node is a base station or a RRH belonging to the base station.

13. The coordinated-transmission node according to claim 12, wherein the processor is further configured to read the program stored in the memory to:

determine, in accordance with the downlink time-frequency resource identifier contained in the received scheduling privilege information, the downlink time-frequency resource corresponding to the downlink time-frequency resource identifier;

determine that the respective one of the terminals is allowed to be scheduled in accordance with the indication information contained in the received scheduling privilege information and indicating that the respective one of the terminals is allowed to be scheduled; and schedule the respective one of the terminals over the downlink time-frequency resource corresponding to the downlink time-frequency resource identifier in accordance with the latest CSI reported by the respective one of the terminals.

14. The coordinated-transmission node according to claim 12, wherein the processor is further configured to read the program stored in the memory to:

determine, in accordance with the downlink time-frequency resource identifier contained in the received scheduling privilege information, a downlink time-frequency resource corresponding to the downlink time-frequency resource identifier;

determine that the further coordinated-transmission node is allowed to be scheduled in accordance with the indication information contained in the received scheduling privilege information and indicating that the scheduling is allowed to be performed for the further coordinated-transmission node;

determine whether or not the respective one of the terminals is to be scheduled over the downlink time-frequency resource corresponding to the downlink time-frequency resource identifier in accordance with the latest CSI reported by the respective one of the terminals, the further coordinated-transmission node being contained in a measurement set of the respective one of the terminals; and upon determining that the respective one of the terminals is to be scheduled over the downlink time-frequency resource corresponding to the downlink time-frequency resource identifier, schedule the respective one of the terminals over the downlink time-frequency resource corresponding to the downlink time-frequency resource identifier, and transmit, through the transceiver, scheduling information to the further coordinated-transmission node.

15. The coordinated-transmission node according to claim 12, wherein the processor is further configured to read the program stored in the memory to: determine, in accordance with the valid time information, whether or not a time domain of the downlink time-frequency resource falls within the time period indicated by the valid time information, and upon determining that the time domain of the downlink time-frequency resource falls within the time period indicated by the valid time information, perform the scheduling in accordance with the received scheduling privilege information and the latest CSI reported by the respective one of the terminals.

16. A Central Coordination Node (CCN) for downlink coordinated-transmission, comprising: a processor, a memory and a transceiver, wherein the processor is configured to read a program stored in the memory to:

determine a scheduling privilege of a coordinated-transmission node over a downlink time-frequency resource in accordance with channel information about a terminal that is connected to the coordinated-transmission node; and transmit, through the transceiver, one message comprising scheduling privilege information corresponding to the downlink time-frequency resource and valid time information corresponding to the scheduling privilege information to the coordinated-transmission node, so that the coordinated-transmission node performs scheduling in accordance with the received scheduling privilege information and latest Channel State Information (CSI) reported by the terminal, the scheduling privilege information corresponding to the downlink time-frequency resource indicating the scheduling privilege of the coordinated-transmission node over the downlink time-frequency resource, the transceiver is configured to receive and transmit data, and the memory is capable of storing therein data for operation of the processor, wherein the valid time information indicates a time period during which the downlink time-frequency resource is valid, the scheduling privilege information corresponding to the downlink time-frequency resource includes a downlink time-frequency resource identifier and indication information corresponding to the downlink time-frequency identifier;

the indication information is at least one of: indication information indicating that the terminal is allowed to be scheduled, and indication information indicating that the scheduling is allowed to be performed for a further coordinated-transmission node; and the scheduling privilege information further comprises indication information about a blanked coordinated-transmission node over the downlink time-frequency resource corresponding to the downlink time-frequency resource identifier, indication information about an interference-avoided coordinated-transmission node over the downlink time-frequency resource corresponding to the downlink time-frequency resource identifier, and indication information about a precoding matrix in which use of the interference-avoided coordinated-transmission node is limited; and the indication information about the blanked coordinated-transmission node is bitmap information indicating the blanked coordinated-transmission node, and the blanked coordinated-transmission node is a base station or a RRH belonging to the base station.

17. The CCN according to claim 16, wherein the processor is further configured to read the program stored in the memory to:

for a coordinated-transmission node where single-cell transmission to the terminal over the downlink time-frequency resource has been determined in accordance with the channel information about the terminal that is connected to the coordinated-transmission node, determine the scheduling privilege of the coordinated-transmission node over the downlink time-frequency resource as allowing the terminal to be scheduled;

for a coordinated-transmission node where the selection or blanking of dynamic transmission points by the terminal over the downlink time-frequency resource has been determined in accordance with the channel information about the terminal that is connected to the coordinated-transmission node, determine the scheduling privilege of the coordinated-transmission node over the downlink time-frequency resource as allowing the scheduling to be performed for the further coordinated-transmission node, and determine a scheduling privilege of the further coordinated-transmission node over the downlink time-frequency resource as receiving scheduling information from the coordinated-transmission node, the further coordinated-transmission node being a coordinated-transmission node in a measurement set of the terminal;

for a coordinated-transmission node that has been determined to be blanked over the downlink time-frequency resource in accordance with the channel information about the terminal that is connected to the coordinated-transmission node, determine the scheduling privilege of the coordinated-transmission node over the downlink time-frequency resource as being blanked; and for a coordinated-transmission node that has been determined to be interference-avoided over the downlink time-frequency resource in accordance with the channel information about the terminal that is connected to the coordinated-transmission node, determine the scheduling privilege of the coordinated-transmission node over the downlink time-frequency resource as limiting use of a precoding matrix during the downlink coordinated-transmission.

* * * * *